March 28, 1933.  H. S. HOLMES  1,902,955
WELDING APPARATUS
Filed Sept. 24, 1928   7 Sheets-Sheet 1

Inventor
Henry S. Holmes
By His Attorney
Anthony Usina

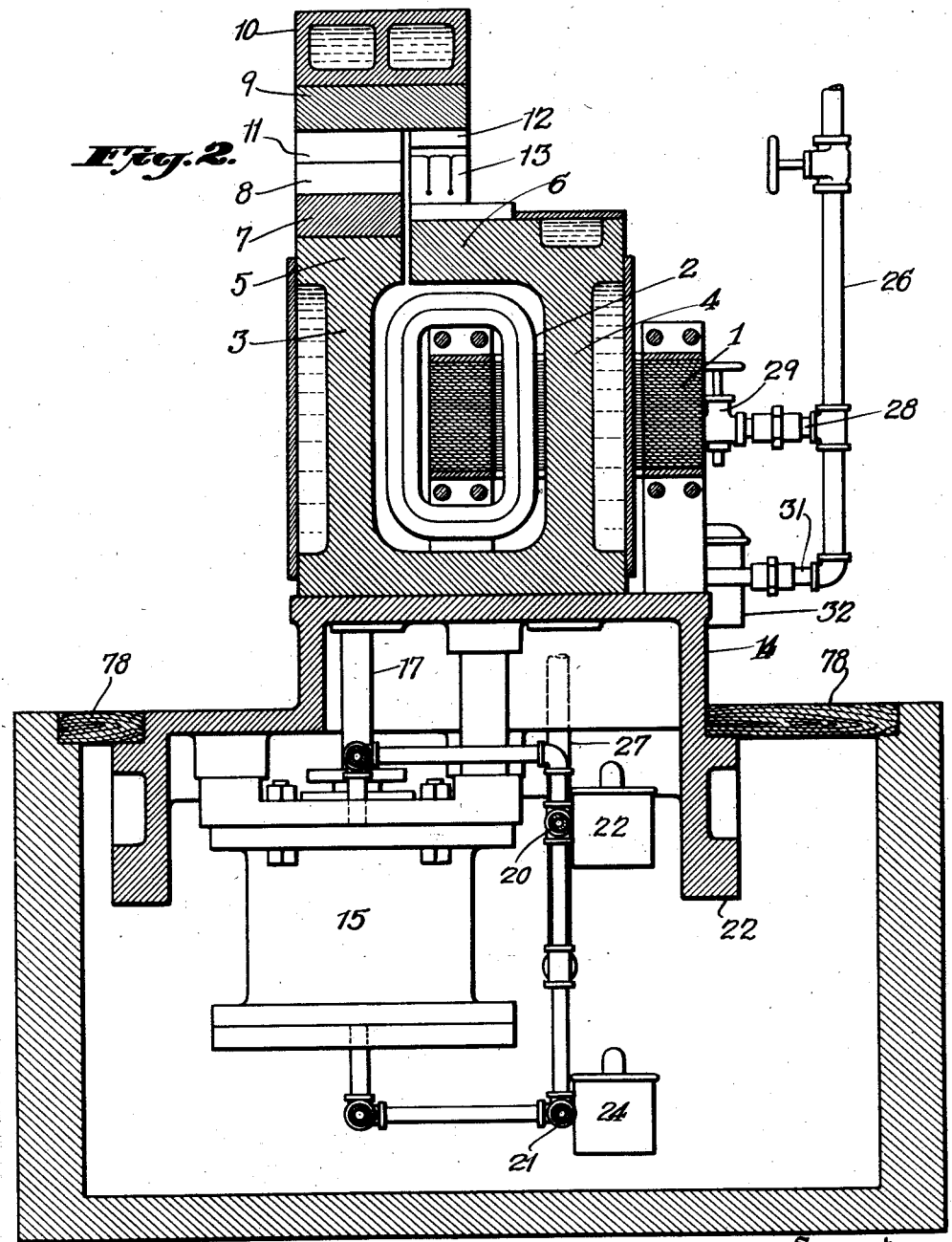

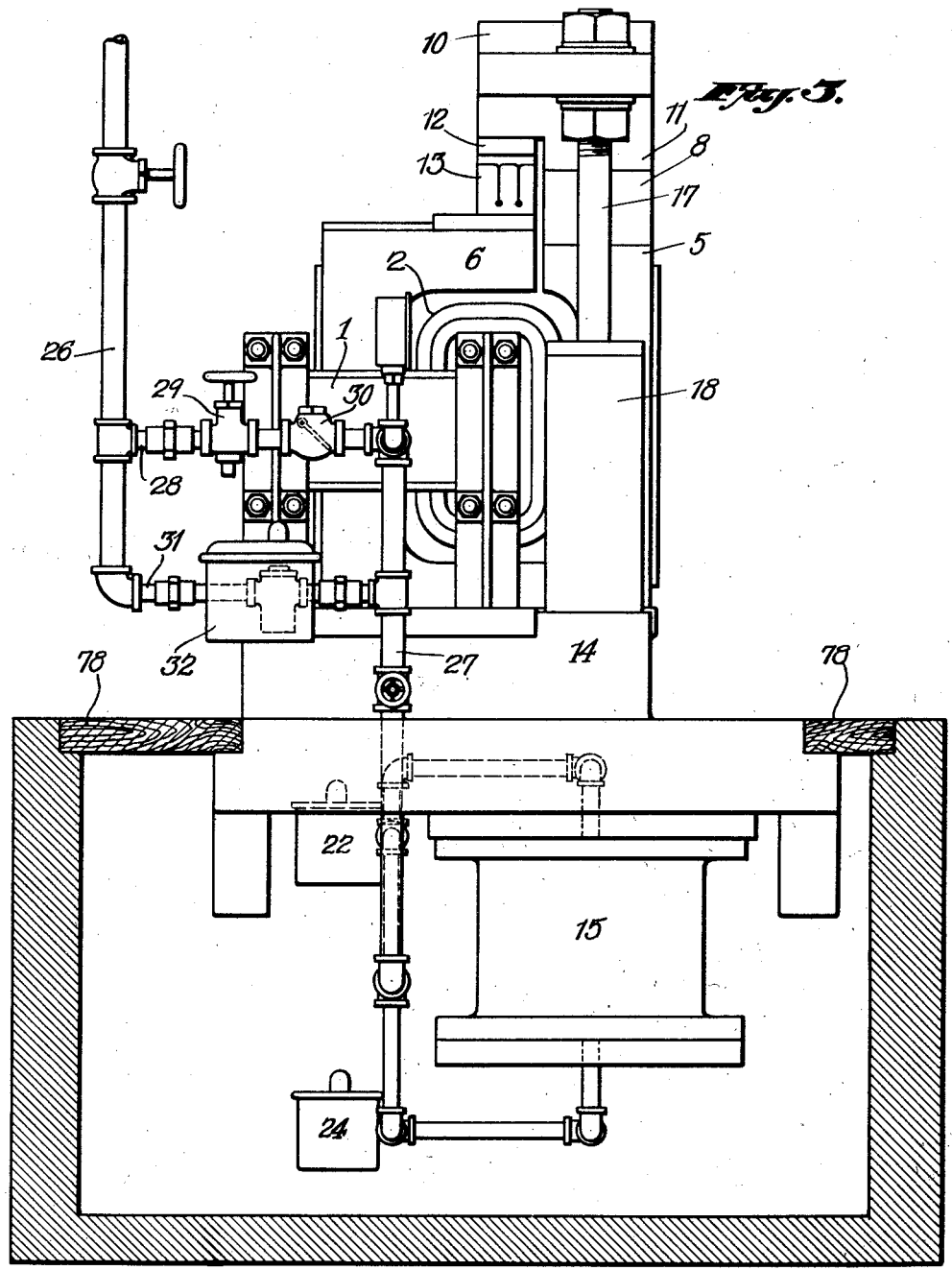

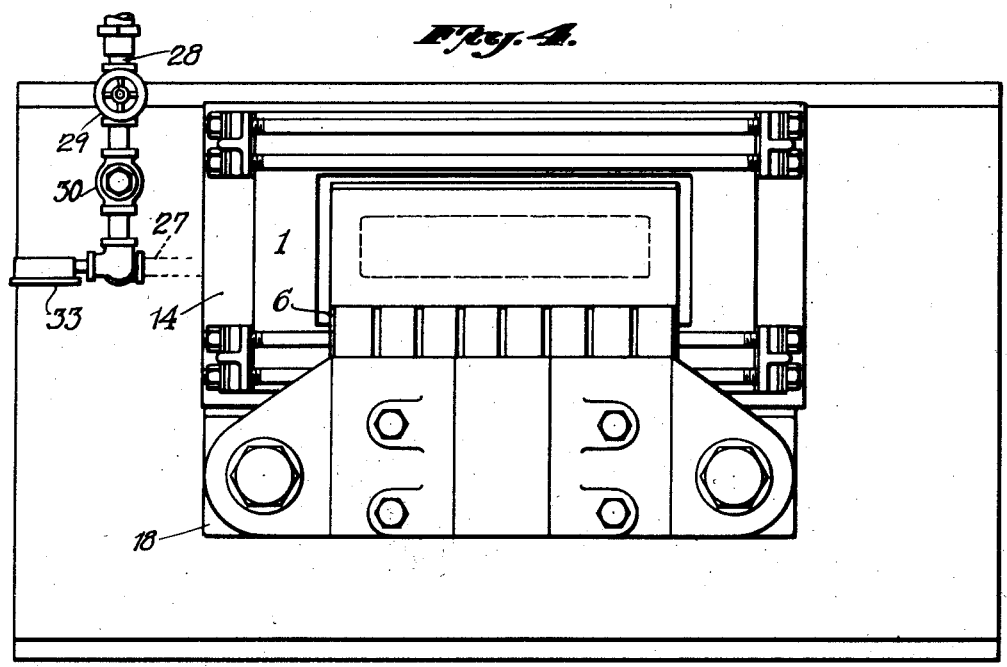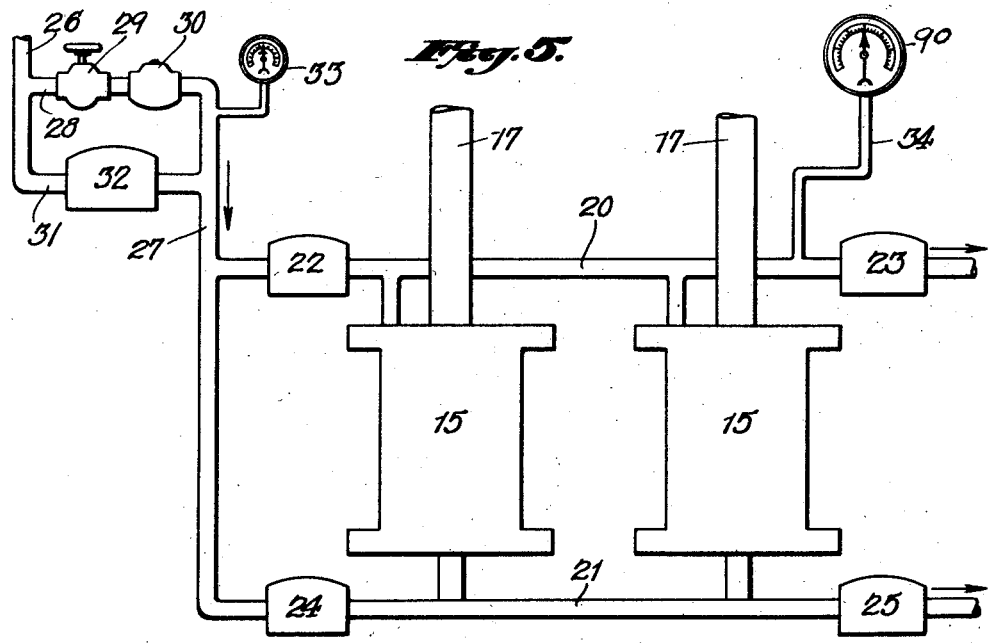

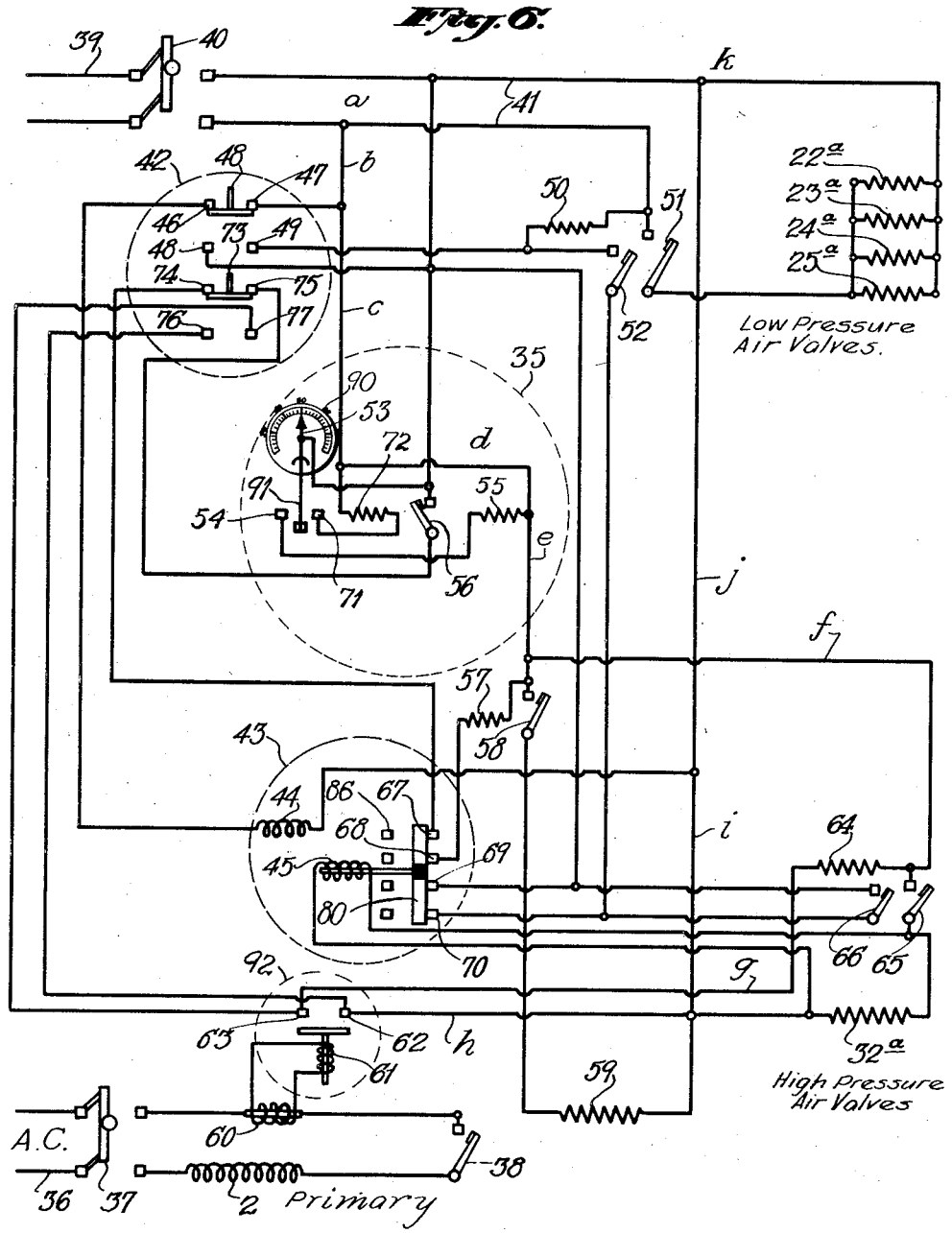

March 28, 1933.　　　H. S. HOLMES　　　1,902,955
WELDING APPARATUS
Filed Sept. 24, 1928　　　7 Sheets-Sheet 6
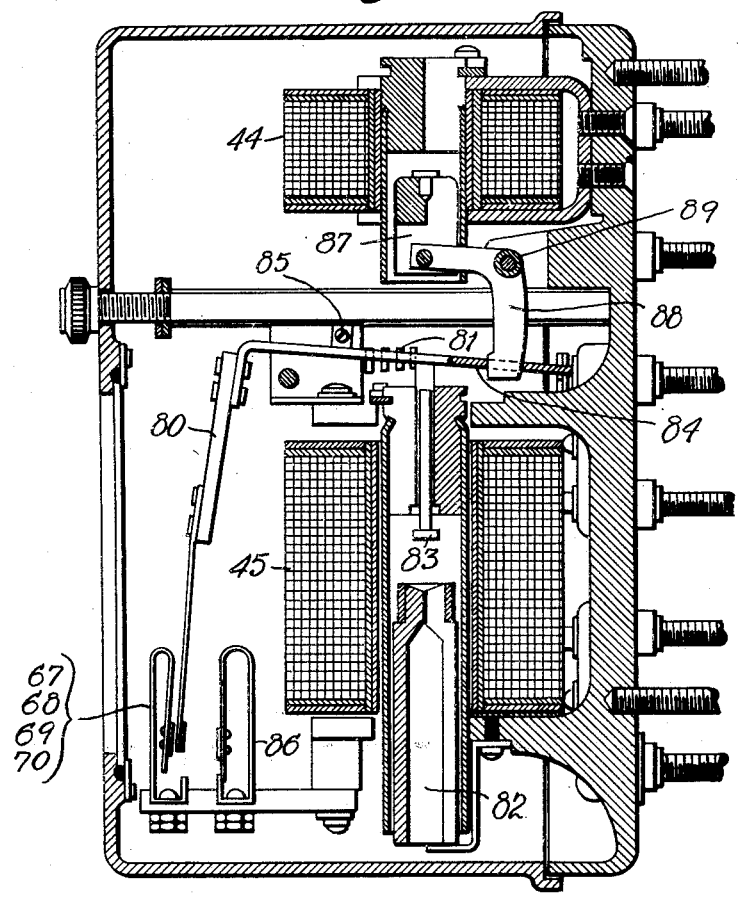
Inventor
Henry S. Holmes
By His Attorney
Anthony Usina

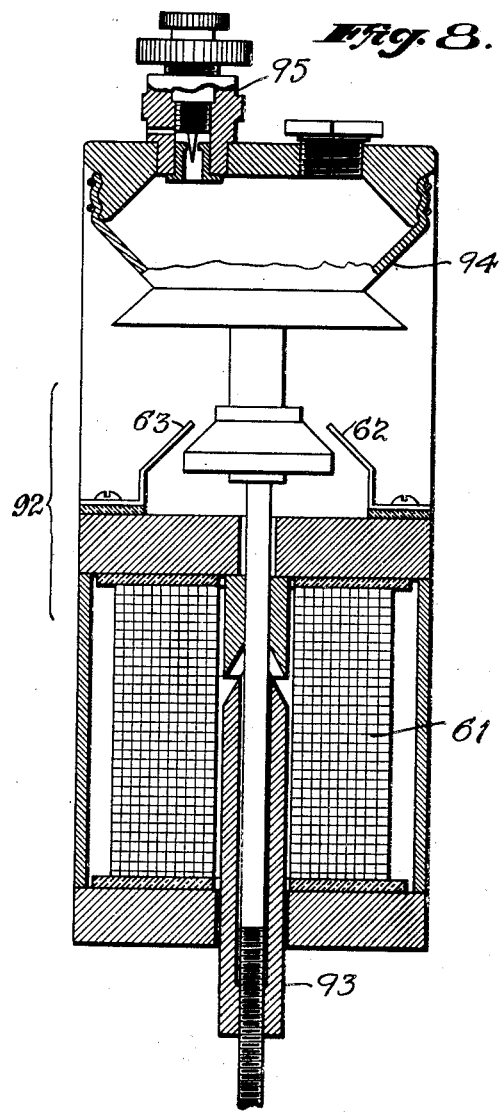

Patented Mar. 28, 1933

1,902,955

UNITED STATES PATENT OFFICE

HENRY S. HOLMES, OF BROOKLYN, NEW YORK, ASSIGNOR, BY MESNE ASSIGNMENTS, TO METROPOLITAN ENGINEERING COMPANY, A CORPORATION OF NEW YORK

WELDING APPARATUS

Application filed September 24, 1928. Serial No. 307,886.

The invention aims to provide a machine for electric welding by pressing the parts together while passing a current between them. Machines for welding the same general class of articles are shown in applications of Holmes, No. 127,202, filed August 5th, 1926 and No. 270,851, filed April 18th, 1928. The machine of the present invention is of simplified construction, economy in space occupied and in weight of the moving parts and is designed and adapted to be used with entirely automatic controls and to achieve a comparatively high rate of production. Other features are referred to hereinafter.

The accompanying drawings illustrate an embodiment of the invention.

Fig. 2 is a vertical cross section on the line 2—2 of Fig. 1.

Fig. 3 is an elevation from the left of Fig. 1.

Fig. 4 is a plan.

Fig. 5 is a diagram of the air piping and controls.

Fig. 6 is a wiring diagram.

Figs. 7 and 8 are sections of details including certain relays.

Figure 1:
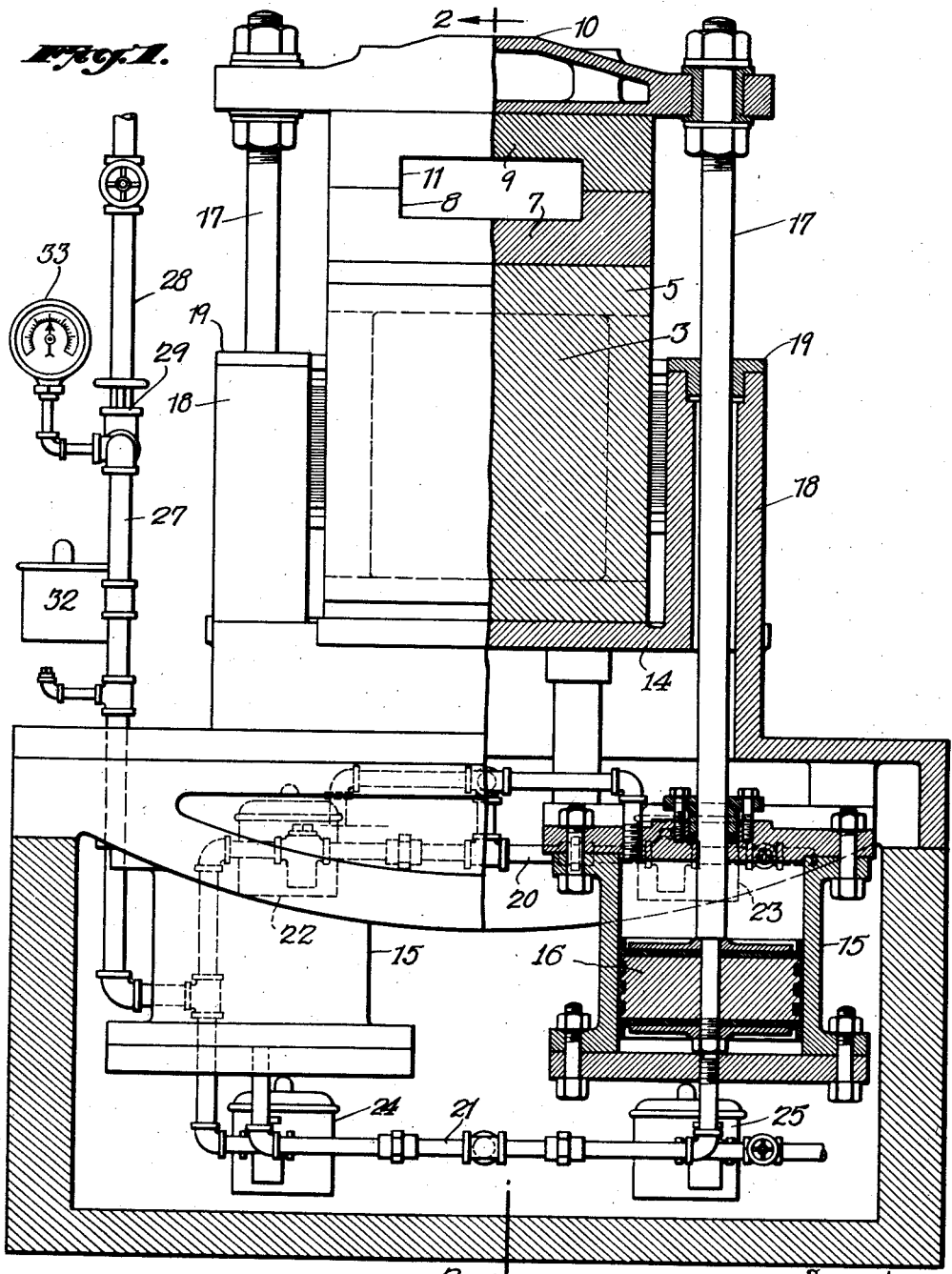
Fig. 1 is a front elevation of the welder, partly in section on the line 1—1 of Fig. 2.

The apparatus is designed particularly for the Murray method of welding in which an extraordinary heavy current is used for a very brief interval of time. The transformer comprises an iron core 1 about which is a primary winding 2 surrounded by a secondary consisting of a copper casting with two upright portions 3 and 4 carrying the poles 5 and 6. On the pole 5 is mounted the fixed lower electrode holder 7 which has a recess 8 to receive an electrode shaped on the top to fit the lower part of the welded article. An upper electrode holder 9 is carried by a reciprocating head 10 and has a recess 11 to receive an upper electrode shaped to fit the top of the article. On the holder 9 are switch blades 12 which are engaged by switch clips 13 on the pole 6.

The transformer is mounted on a cast iron base 14, on the under side of which are carried two air cylinders 15 with pistons 16 connected to piston rods 17 which extend upward through hollow columns 18 forming part of the base and carrying bearings 19. At the upper ends of the piston rods they are fastened to and insulated from the cast iron head 10 which carries the upper electrode holder.

An important feature of the invention is in the controlling mechanism which makes the operation of the welder fully automatic. A brief description of this operation follows. Assume that the main supply air pressure is 100 pounds, that the pressure control valve or reducing valve is set at 80 pounds, and that the pressure relay is set at 60 pounds.

The operator places two work pieces in the electrodes. He touches a push button and certain solenoid operated valves are energized and remain energized after he removes his finger from the button. This allows air to flow into the top of the air cylinders. The head of the welder then goes down, and when the air pressure reaches 60 pounds, the pressure relay functions and the welding current is established. The air pressure continues to increase to 80 pounds as determined by the reducing valve, while the edges of the work pieces get hot. The welding current, either directly, or as described here, by means of a current transformer, energizes a definite-time-limit relay. The plunger of this relay acting under a constant force, presses against air bellows, forcing the air out of it through an adjustable needle valve. This requires a definite predetermined time after which an electrical contact is made which energizes a solenoid operated valve. The opening of this valve by-passes the air around the reducing valve, thus applying a heavier pressure on the work pieces, in this case 100 pounds. At the same time, the welding current is stopped by means of a relay connected in parallel with the solenoid of the air valve. When the welding current is stopped, the time limit relay is deenergized and the weight of its plunger sucks air in the needle valve so that after a short time the contacts in the relay are opened, which reverses all the solenoid operated air valves, thus allowing the head of the welder to go up. The welded product may then be removed and new work pieces inserted ready for another weld.

A pipe 20 (Fig. 5) communicates with the upper ends of the cylinders 15, and a pipe 21 with their lower ends. A solenoid-operated valve 22 controls the admission of air to the pipe 20 and a solenoid-operated valve 23 controls the exhaust therefrom. Similar solenoid-operated valves 24 and 25 control the admission to and the exhaust from the lower ends of the cylinders. Air from the high pressure main 26 passes through either of two branches to the line 27 leading to the pipes 20 and 21. In the branch 28 is an adjustable pressure regulating valve 29 and a check valve 30 to prevent back flow of high pressure air from pipe 27. In the second branch 31 is a solenoid-operated valve 32 for putting full line pressure into the pipes 27, 20 and 21. A gauge 33 serves to measure the reduced pressure. The small pipe 34 leads to an air pressure relay 90.

The diagram, Fig. 6, illustrates the electrical connections. The alternating current comes from the leads 36 through the normally closed switch 37. When the switch 38 is closed the current flows through the circuit of the primary 2, and causes the secondary or welding current to flow through the work. The various controls are operated by direct current from the mains 39 through the normally closed switch 40 and the lines 41. The dotted ring 35 indicates the parts of the relay 35 which operates when the pressure in the upper ends of the cylinders rises to a certain point indicating that the upper electrode is pressing on the work and resisting the further downward movement of the pistons.

Within the ring 42 are two push buttons for making and breaking the control circuits. Only the upper button 48 is used in normal operation. Depressing this button opens the contacts 46, 47 and closes the contacts 48, 49. This starts a series of automatic operations which complete the welding cycle. The button 48 is immediately released and the contact bar again closes contacts 46, 47, by means of a spring.

Within the ring 43 is an auxiliary relay shown in detail in Fig. 7. Contact arm 80 is normally held against the contacts 67, 68, 69, 70 by means of the spring 81. Energizing coil 45 raises the plunger 82 which strikes the rod 83, thus raising one end of the arm 84 which is pivoted at 85. This moves the contact bar 80 away from the contacts 67, 68, 69, 70 and against the contacts 86 which are not used. Coil 44, when energized, attempts to raise the plunger 87 which is connected to the latch 88, pivoted at 89. One end of the latch 88 enters a slot in the arm 84. When this arm 84 is up and the coil 44 is energized, the plunger 87 will be raised and the latch 88 will hook under the arm 84, thus holding the contact bar 80 against the contact 86. When coil 44 is deenergized, the plunger 87 will drop, thus unlatching the arm 84 and allowing the bar 80 to strike the contacts 67, 68, 69, 70, by means of the spring 81. Coil 44, is always energized except at the instant of pressing the starting button 48.

Within the circle 35 is a pressure governor relay. The pressure gauge 90 is connected by a pipe to the upper ends of the air cylinders 15 (see Fig. 5). When the air pressure is up to a certain predetermined amount, the contact arm 91, attached to one end of the pointer 53, touches the contact 54. When the air pressure is down to a certain amount, the arm 91 touches the contact 71. Closing contact 54 energizes coil 55, thus closing contact 56. Closing contact 71 energizes coil 72, thus opening contact 56.

Within the circle 92 is a time-limit relay shown in detail in Fig. 8. The coil 61 when energized, forces the plunger 93 upwards, thus closing the contacts 62, 63. The coil 61 is so designed that the plunger 93 is well over saturated when current is flowing through the secondary of current transformer 60, the primary of which is in the welding circuit. This over saturation causes the plunger 93 to exert a uniform upward pressure. The movement of the plunger 93 is retarded by the leather air bellows 94, the air in which exhausts through the adjustable needle valve 95. By properly adjusting this valve, the time required for closing the contacts 62, 63 may be set for any predetermined time after the energizing of coil 61. When the coil 61 is de-energized, the weight of the plunger 93 causes the air bellows 94 to distend, thus sucking air in through the needle valve 95, which allows the contacts 62, 63, to open after a short time.

The sequence of operations is as follows:
The operator places the work pieces in the electrodes. He then depresses push button 48 and immediately releases it. Pushing button 48 first breaks contacts 46, 47. This momentarily deenergizes coil 44 which unlatches arm 80 and allows it to touch contacts 67, 68, 69 and 70. Further pressure on the button 48 closes the contacts 48, 49, which energizes coil 50, thus closing contacts 51 and 52. Switch 52 parallels contacts 48, 49 and keeps the coil 50 energized after the button 48 has been released. Closing switch 51 energizes solenoids 22ª, 23ª, 24ª, 25ª, of the correspondingly numbered air valves. These air valves are spring pressed to such positions that they normally hold the upper electrode raised, the admission valve to the lower ends of the cylinders and the exhaust valve from the upper ends being open and the opposite valves being closed. When the solenoid coils 22ª, etc., are energized as mentioned above, the positions of the four valves are reversed and the pistons 16 of the air cylinders 15 are pressed down until the upper electrode 9 bears on the work pieces.

The air pressure then builds up in the pressure gauge 90 and when it reaches a predetermined amount it forces the contact 91 against the contact 54. The current flows from point $a$ through lines $b, c, d, e$ and $f$ through coil 64, line $g$, contacts 63, 62, lines $h, i$ and $j$ to the other side of the supply at $k$. This value of the air pressure may be that determined by the setting of the reducing valve 29, or it may be of some lower value, in which case the air pressure in the top of the cylinder 15 continues to build up until it reaches the value determined by the reducing valve 29. The closing of contact 54, however, energizes coil 55 which closes contact 56. This closure energizes coil 57, which closes switch 58, thus energizing coil 59, which is the closing coil of the switch 38, which switch is in the primary circuit 2. This closure allows current to flow through the edges of the work pieces and starts the weld.

When the current flows from switch 36 through the primary 2, the switch 38 and the current transformer 60, it induces in the secondary winding of the latter a current which energizes the coil 61. Energizing coil 61 closes the contacts 62, 63 after a definite predetermined time as described above. Closing contacts 62, 63 energizes a coil 64 which closes switches 65 and 66. Closing switch 65 energizes coils 32ª and 45 which coils are in parallel. Closing switch 66 parallels contacts 69, 70 and keeps coil 50 energized, even after contacts 69, 70 are opened. Energizing the coil 32ª opens the air valve 32 which by-passes the reducing valve 29 and allows full supply pressure to act on the top of the air pistons 16. Thus the end of the welding operation is under higher pressure. The energizing of coil 45 simultaneously with the application of the higher pressure opens the contacts 67, 68, 69, 70 and they are held open by the latch 88 (Fig. 7). Opening contacts 67, 68 deenergizes coil 57 which allows switch 58 to open, thus deenergizing coil 59 which allows switch 38 to open and to interrupt the welding current. The machine is then automatically restored to starting position as follows:

When switch 38 opens, coil 61 is deenergized, and after a short time lag, as described above, contacts 62, 63 open. This deenergizes coil 64 which allows switches 65 and 66 to open. Opening switch 65 deenergizes coils 45 and 32ª. Nothing happens when coil 45 is deenergized. The deenergization of coil 32ª allows the high pressure air valve 32 to close. The opening of switch 66 deenergizes coil 50, which allows switches 51 and 52 to open. The opening of switch 51 breaks the circuit through the solenoids of the several air valves 22, 34, 24 and 25 whereupon the head of the welder will be moved up. The release of the pressure in the top of the cylinder 15 allows the indicator 53 of the pressure gauge 90 to fall back, thus closing the contact 71 which causes a current in the coil 72, which opens up the main contact 56. The parts are now in their original position.

A button 73, only used when adjusting the machine or in an emergency, operates as follows:

When pressed, it opens two contacts 74, 75 and closes contacts 76 and 77; thereby deenergizing coil 57 and opening contactor 58. At the same time the closing of the contacts 76 and 77 causes a flow of current through the coil 64, which closes the contactor 65 and energizes the coil 32ª which opens the high pressure air valve. The release of the button 73, causes the opening of the contacts 65 and 66, thereby opening the contactor 51, breaking the circuit of the solenoids 22ª, 23ª, 24ª and 25ª, and causing the head to move up rapidly.

The particular designs of the relays and other controlling devices and their time regulation, may be varied to suit the character of the work.

The cylinders and the principal controls are located below the floor 78, Figs. 2 and 3. By mounting them on the under side of the main casting 14 which supports the transformer (which in turn supports the work) an economy of head room is achieved as well as lateral space. The location of the electrodes immediately in line with the leg 3 at one side of the transformer permits the operator to stand close to the work while welding and helps to speed the rate of production. The upward reaction of the cylinders directly to the bottom of the base 14 eliminates the upright columns and crown which were used with the old machines and permits the use of a simple construction in which the principal moving parts are the two piston rods 17 and the small head 16. These constitute also a comparatively light assemblage of moving parts.

The automatic control described is of particular importance in high speed welding operations such, for example, as the Murray method in which the work-pieces are pressed together and a current of extremely high density is passed for a very brief interval of time.

Various modifications may be made by those skilled in the art without departing from the invention as defined in the following claims.

What I claim is:

1. A welding machine comprising a base, a lower electrode supported thereon, a movable upper electrode, power mechanism below the base and reacting upward against the same and a head carrying the upper electrode and pulled down by said power mechanism.

2. A welding machine comprising a base, a transformer on the base, a lower electrode supported by the transformer, a movable upper electrode, power mechanism below the base and reacting upward against the same and a head carrying the upper electrode and pulled down by said power mechanism.

3. A welding machine comprising a transformer having an upright leg at the front, electrodes in vertical alignment with said leg so as to be close to the front of the machine, and means for bringing said electrodes together with the work between them near the front of the machine and for passing a current between them.

4. A welding machine comprising a transformer with a secondary having two upright pole pieces, the first at the front of the machine and the second at the rear of the first with a gap between them, a lower electrode carried on top of the first pole piece so as to be at the front of the machine, a head and an upper electrode carried thereby above the lower one, contacts carried by the second pole piece and the head at the rear of the gap and means for reciprocating said head to press the electrodes together and close the circuit through the work.

5. A welding machine comprising a transformer with a secondary having two upright pole pieces, the first at the front of the machine and the second at the rear of the first with a gap between them, a lower electrode carried on top of the first pole piece so as to be at the front of the machine, a head and an upper electrode carried thereby above the lower one, contacts carried by the second pole piece and the head at the rear of the gap and means for reciprocating said head to press the electrodes together and close the circuit through the work, the front pole piece extending rearwardly only to a distance corresponding to the electrode and the rear piece being brought forward to locate the gap in a plane which is in front of the central plane of the transformer.

6. A welding machine comprising a movable electrode, fluid pressure cylinders for operating the same, pipes communicating with the upper ends of the cylinders and with their lower ends respectively, a solenoid-operated admission valve and a solenoid-operated exhaust valve in each of said pipes and automatic means for operating said valves simultaneously to raise or lower the electrode, a second electrode and means for passing a current between the electrodes.

7. A welding machine comprising a movable electrode, fluid pressure cylinders for operating the same, pipes communicating with the upper ends of the cylinders and with their lower ends respectively, a solenoid operated admission valve and a solenoid operated exhaust valve in each of said pipes and automatic means for operating said valves simultaneously to raise or lower the electrode, means for supplying air to said admission valves at low pressure and at high pressure, a second electrode and means for passing a current between the electrodes.

8. An electric welding machine having a pair of relatively movable electrodes, a welding circuit, a switch controlling said circuit, air pressure mechanism for pressing said electrodes together, with the work between them, and an air pressure relay for actuating said switch, said relay being set to operate at a predetermined pressure.

9. An electric welding machine having a pair of relatively movable electrodes, a welding circuit, a switch controlling said circuit, air pressure mechanism for pressing said electrodes together, with the work between them, and an air pressure relay for actuating said switch, said relay being set to operate at a predetermined pressure and means for thereafter applying a higher pressure to the electrodes.

10. An electric resistance butt welding machine, comprising relatively movable electrodes, means for clamping work pieces therein and exerting a predetermined take-up pressure thereon, means dependent on the clamping and take-up pressure for automatically starting the weld, automatic means for increasing by a further predetermined amount the take-up pressure during the weld, automatic means for simultaneously stopping the weld and exerting a further predetermined take-up pressure after a definite predetermined time interval, and automatic means for releasing the take-up pressure and separating the electrodes after a further definite, predetermined time interval.

11. An electric welding machine having a pair of relatively movable electrodes, a welding circuit, a switch controlling said circuit, air pressure mechanism for pressing said electrodes together, with the work between them, and an air pressure relay for actuating said switch, said relay being set to operate at a predetermined pressure, means for supplying air at two different pressures, first at a lower pressure to press the electrodes together and operate said relay and then at a higher pressure to take up the work.

12. An electric resistance welding machine comprising relatively movable electrodes, means for exerting a welding pressure and passing a welding current between them, a pressure-releasing means, a definite time limit relay controlled by the current and mechanism controlled by said relay for actuating said pressure-releasing means.

13. An electric resistance welding machine comprising relatively movable electrodes, means for exerting a welding pressure and passing a welding current between them, means for separating said electrodes, a definite time limit relay controlled by the current and mechanism controlled by said relay for actuating said electrode-separating means.

In witness whereof, I have hereunto signed my name.

HENRY S. HOLMES.